United States Patent [19]
Dillard et al.

[11] Patent Number: 5,596,870
[45] Date of Patent: Jan. 28, 1997

[54] GAS TURBINE EXHAUST LINER WITH MILLED AIR CHAMBERS

[75] Inventors: Gary J. Dillard, Stuart; Timothy J. McAlice, Jupiter, both of Fla.

[73] Assignee: United Technologies Corporation, Hartford, Conn.

[21] Appl. No.: 303,915

[22] Filed: Sep. 9, 1994

[51] Int. Cl.$^6$ .................................................. F23R 3/42
[52] U.S. Cl. ........................................... 60/39.02; 60/752
[58] Field of Search .................... 60/752, 753, 754, 60/755, 756, 757, 266, 267, 39.02; 165/906, 907, 908

[56] References Cited

U.S. PATENT DOCUMENTS

| | | | |
|---|---|---|---|
| 2,938,333 | 5/1960 | Wetzler | 60/752 |
| 3,408,812 | 11/1968 | Stenger | 60/757 |
| 3,910,039 | 10/1975 | Fortini | 60/265 |
| 4,113,549 | 9/1978 | Brimm | 156/639 |
| 4,339,925 | 7/1982 | Eggmann et al. | 60/757 |
| 5,239,823 | 8/1993 | Sims | 60/752 |

FOREIGN PATENT DOCUMENTS 308926  12/1990  Japan .......................... 60/752

OTHER PUBLICATIONS

Taft, William G.; Designing High–Strength Lightweight Structures, *Machine Design*, Jan. 7, 1988, pp. 99–103.

*Primary Examiner*—Timothy S. Thorpe
*Attorney, Agent, or Firm*—Robert E. Greenstien

[57] ABSTRACT

An exhaust liner assembly for a gas turbine engine contains a unitary liner sheet and an impingement sheet, which contain holes for cooling air to enter chambers that are defined by chemically milled areas in the liner. The chambers are in an isogrid pattern, with the chambers having a polygon shape defined by walls that are left after the liner is milled. The walls intersect at nodes and fasteners are attached to the nodes to attach the impingement sheet to the liner.

5 Claims, 2 Drawing Sheets

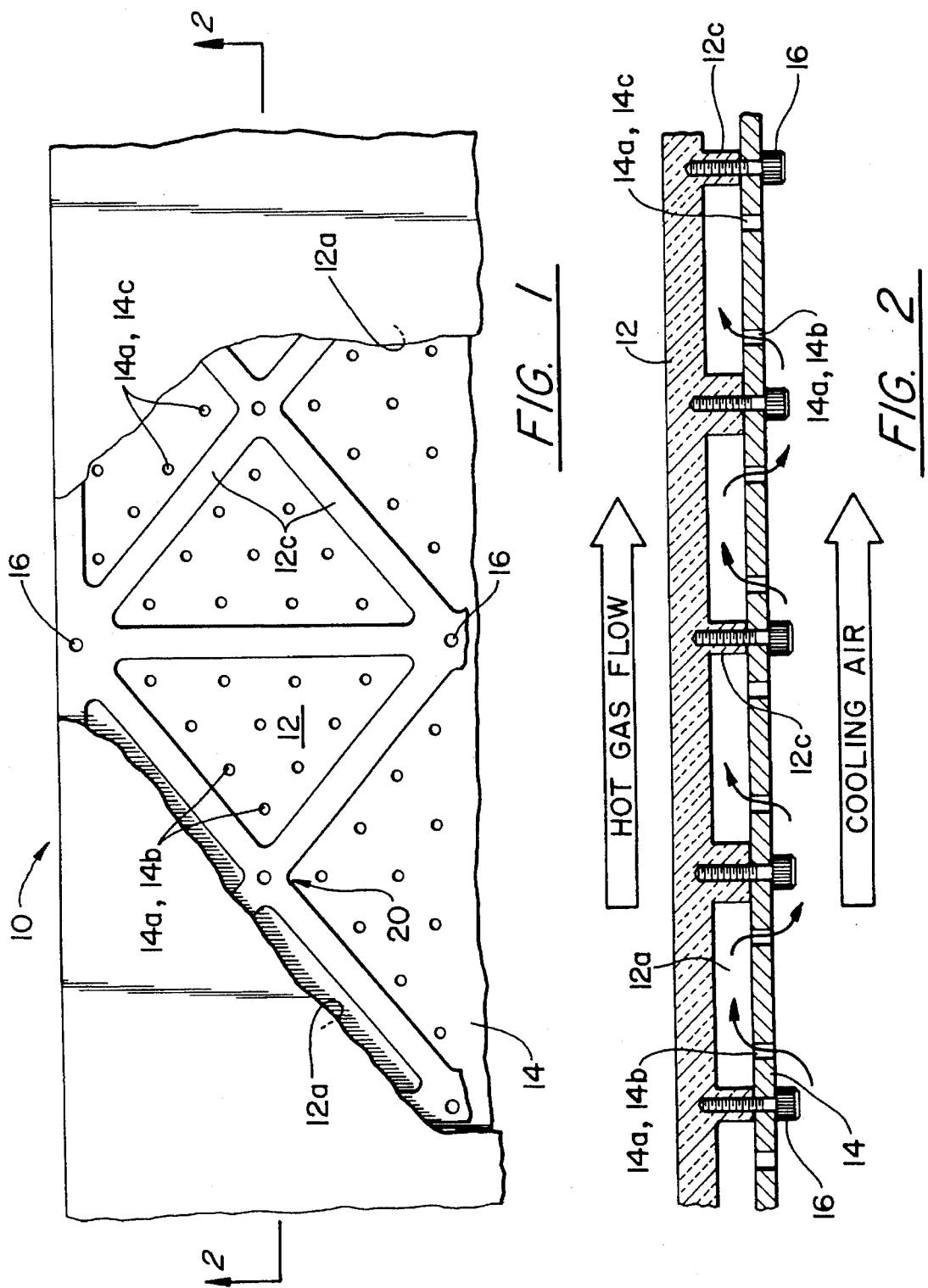

N = 3

N = 4

N = 6

N = ∞

GAS TURBINE EXHAUST LINER WITH MILLED AIR CHAMBERS

The invention was made under a U.S. Government contract and the Government has rights herein.

TECHNICAL FIELD

This invention relates to gas turbine engines, in particular, forced air cooled liners.

BACKGROUND OF THE INVENTION

U.S. Pat. No. 2,938,333 shows a typical gas turbine engine that is used for aircraft propulsion and includes a hot gas flow section, following the turbine, that is contained in an air cooled liner "assembly" having an impingement sheet surrounding a liner sheet. The hot engine exhaust is constrained within the liner, and air is forced through the the impingement sheet and the liner, cooling the liner. The cooling air exits at the exhaust end of the engine.

The liner assembly is exposed to considerable heating, and, as would be expected, liner heating can be very uneven, creating local thermal stresses. For one thing, the upstream area is much hotter than the down stream area. The liner, which must be as light as possible, is supported on the engine, but in such a way that buckling is minimized, as buckling can lead to local stresses and premature liner fatigue. Support is typically provided by brackets, as demonstrated in U.S. Pat. No. 2,938,333.

The conventional liner, such as the liner in U.S. Pat. No. 2,938,333, is made of sheet metal and the impingement and liner sheets are attached by welding or by fasteners, a design, though common, is not particularly rigid, increasing the tendency for temperature induced liner warpage. These designs also do not lend themselves to modulating cooling airflow so that the hotter areas receive more airflow than the cooler areas. Additionally, the flexible cupped membrane configuration used in such liners, as shown in U.S. Pat. No. 2,938,333, is not compatible with the smoothness and coating retention requirements for low observable advanced military engine exhaust systems.

DISCLOSURE OF THE INVENTION

Among the objects of the present invention is providing an improved gas turbine liner having enhanced structural and temperature stability and ease of construction.

According to the invention, the liner is a unitary piece with milled chambers or pockets that have symmetrical, polygon shapes. The milled walls (interconnected homogeneous ribs) of the chambers define nodes at which fasteners are attached to attach an impingement sheet with holes for air to enter and leave the chambers.

According to one aspect of the invention, the liner is milled by a chemical milling process, the ribs being the area not exposed to the the chemical milling material.

Among the features of the present invention, the liner is very light, but structurally and thermally very rigid. The polygon chambers and nodes allow the impingement sheet to thermal float with the stresses between the nodes evenly distributed along the length of the impingement sheet and the liner. The impingement sheet contains holes for cooling air to enter the chambers, but the density of the holes may be varied among the chambers to provide more cooling air upstream than downstream.

Other objects, benefits and features of the invention will be apparent to one skilled in the art from the following description, in which:

BRIEF DESCRIPTION OF THE DRAWING

FIG. 1 is a plan view, including a partial cutaway, of a liner embodying the present invention.

FIG. 2 is a section along line 2—2 in FIG. 1.

BEST MODE FOR CARRYING OUT THE INVENTION

Figure 3A:
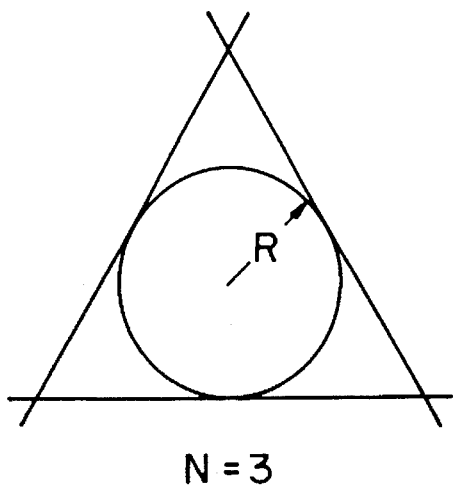
FIGS. 3a–3d illustrate different polygon configurations for the chambers that are part of a liner embodying the present invention.

As noted before, the present invention may be used in place of the liner shown in the above mentioned U.S. Pat. No. 2,938,333, incorporated herein by reference for showing a typical gas turbine engine and liner. In FIG. 1 of this application, a liner assembly 10 is shown that includes a liner 12 and an impingement sheet 14. Briefly, and with reference also to FIG. 2, the liner 12 directs hot gas flow from a gas turbine (not shown) while cooling air is applied under pressure to the impingement sheet 14, which contains holes 14a that lead into chambers 12a in the liner 12. Upstream cooling air flows into upstream holes 14b and exits the downstream holes 14c associated with each chamber 12a. The chambers 12a are defined by walls or ribs 12c which are milled into the liner, leaving the back-wall 12d. The ribs are homogeneous or continuous as a result of the milling process by which they are formed. The liner is constructed from a single or unitary sheet. As shown in FIG. 1, the walls 12c define a polygon, in the case of the embodiment in FIG. 1, a triangle. The impingement sheet is attached to the liner 12 by fasteners 16. The fasteners are threaded through "nodes" 20 defined by the intersection of the walls or milled ribs 12c. At selected nodes, a bracket 18 (not shown) may be installed to hold the liner assembly in place on the engine.

One way to mill the liner is by so called "chemical milling", a process described in the article "Designing High-Strength Lightweight Structures", Machine Design, Jan. 7, 1988, which shows a bypass duct for a jet engines made using a chemical milling process practiced by Chemtronics, Inc., El Cajon, Calif. With such milling, the walls (also referred to here as ribs in the alternative) 12c are just a concentration material, acting like a column. Ribbed structures are usually formed in three ways: extruding or machining the rib and brazing it to a skin; bending metal to shape a rib and riveting it to a skin; or by chemical milling. As observed previously, the invention contemplates use of a homogeneous or unitary liner 12, as shown, and thus chemical milling is an especially practical way to achieve that construction. The above article on chemical milling recognizes the advantages that may be obtained in using an isogrid pattern, such as the equiangular triangle configuration that is shown in FIGS. 1 and 2. The present invention, however, uses a conventional isogrid rib arrangement, not the "ribbed-skin isogrid" pattern shown in the art, although, ignoring cost, that arrangement conceivably could also be used.

Figure 3B:
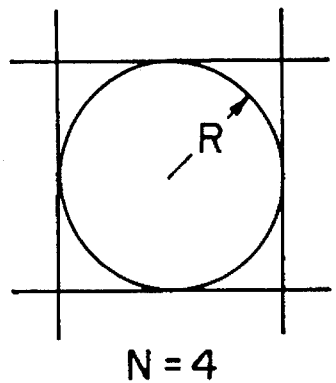
Figure 3C:
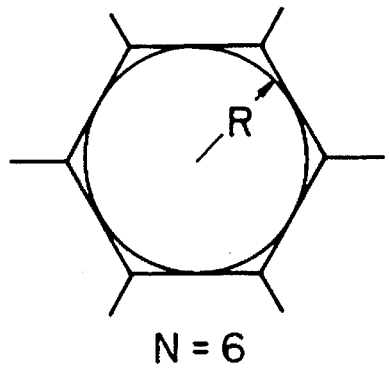
Figure 3D:
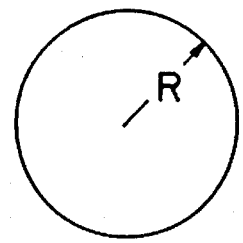

The selection of the "pocketed configuration" (the pockets or chambers are defined by the machined ribs in the liner) is important in distributing the physical and thermal load on the liner and the impingement sheet, providing improved thermal and structural stress resistance. This may be explained by the following relationships (equations 1, 2, 3)

with reference to the diagrams shown in FIGS. 3a, 3b, 3c and 3d. These relationships define the critical buckling stress, maximum normal pressure stress and center deflection in each pocket of the liner.

Critical Buckling Stress: $\quad K_1 \cdot \dfrac{E}{(1-v)^2} \cdot \left(\dfrac{t}{R}\right)^2 \quad$ (1)

Maximum normal pressure stress: $\quad \dfrac{1}{K} \cdot \dfrac{E}{(1-v)^2} \cdot \left(\dfrac{R}{t}\right)^2 \quad$ (2)

Center Deflection: $\quad \dfrac{1}{K^3} \cdot \dfrac{1}{E} \cdot \dfrac{R^4}{t^3} \quad$ (3)

In the above equations, there is first a scaling term $K_1$, $K_2$, $K_3$ which is independent of the number of polygonal sides, second a material term, dependent on E=elastic modulus and v=Poisson ratio, and third a geometry term dependent only on t=the liner thickness and R=radius of the inscribed circle of the polygon. The relative stiffness of the liner and impingement sheet are balanced in such a way that the resultant thermal stress, when superpositioned with the pressure stress, is below both the limiting strength of the material and the critical buckling stress of the pocket. Thus, the liner behaves overall as a sandwich structure and locally as a series of small bounded plates.

Any number of polygonal shapes, such as those shown in FIGS. 3a, 3b, 3c and 3d will produce the same result. The minimum (an equiangular triangle) will have the fewest nodes for a given value of R that is required, and is therefore desirable where the attachment weight is large relative to the liner.

Other objects, benefits and features of the invention will be apparent to one of ordinary skill in the art from the following discussion of one or more embodiments.

We claim:

1. An exhaust liner for a gas turbine engine, characterized by:

an impingement sheet comprising a plurality of air holes:

a liner comprising a unitary sheet having milled, homogeneously joining fibs that form connected walls defining air chambers for receiving air from said air holes; and fasteners at nodes on the liner, said fasteners extending through the impingement sheet into to the finer, said nodes being at the intersections of said ribs, said ribs intersecting at equal angles and being the same length.

2. The liner described in claim 1, further characterized on that the number of air holes per chamber is different along the length of the impingement sheet.

3. A method of constructing an exhaust liner for a gas turbine engine characterized by:

milling chambers ribs in a unitary liner to form air chambers in which the ribs form homogeneous walls, the chambers having equiangular polygon shapes and the ribs meeting to form milled nodes to receive fasteners;

attaching an impingement sheet to the unitary liner by extending fasteners through the impingement sheet into the nodes, said fasteners being the sole means of attaching the impingement sheet to the liner.

4. The method described in claim 3, further characterized by:

chemically milling said fibs in the unitary liner.

5. A liner for the exhaust of a gas turbine engine characterized by:

an impingement sheet attached to the nodes at the junction of milled ribs on a liner, said ribs being chemically milled in the liner in an equiangular polygon pattern by masking a portion of the liner from a chemical milling material and thereby being elevated to form chambers and forming said nodes; and the impingement sheet contains a plurality of air holes extending through the impingement sheet to supply air at an upstream location to a chamber for exit of said air from a downstream location of said chamber.

* * * * *